Patented Dec. 26, 1933

1,941,108

UNITED STATES PATENT OFFICE 1,941,108

PRODUCTION OF VINYL ETHERS

Walter Reppe, Ludwigshafen-on-the-Rhine, Germany, assignor to I. G. Farbenindustrie Aktiengesellschaft, Frankfort-on-the-Main, Germany No Drawing. Application December 9, 1929, Serial No. 412,941, and in Germany December 24, 1928

12 Claims. (Cl. 260—151)

The present invention relates to the production of vinyl ethers.

I have found that olefinic ethers, particularly vinyl ethers, which hitherto have been difficultly obtainable, are obtained in a very simple manner by treating vinyl halides, which term includes the homologues and substitution products of these halides, containing at least one hydrogen atom connected with the carbon atom of the double linkage which is free from halogen, with alcoholates of the aliphatic, cycloaliphatic, aliphatic-aromatic or aromatic series in the presence of organic diluents such as solvents or suspending agents. The alcoholates are preferably chosen from those of the alkali metals or alkaline earth metals, since these are easily available but other alcoholates may be employed. It is preferable to operate at an elevated temperature, generally between about 50° and 200° C., the higher temperatures being preferably applied on working with aromatic alcoholates so that the reaction mixture will be warmed a little when the heat generated by the reaction is not sufficient to accelerate the reaction. The vinyl chlorides are preferred since they are easily available and cheapest but the other halides may be employed if desired.

The process may be carried out at atmospheric pressure or at superatmospheric pressure for example by working in a closed apparatus under the pressure which prevails under the given reaction conditions, or at a pressure which may be produced by introducing inert gases, which do not react with the alcoholates, for example methane, nitrogen, hydrogen or mixtures thereof. When working at atmospheric pressure it is preferable to operate in such a manner that the vinyl halide passes in a cycle through a reaction vessel in which the reaction components are present under the necessary reaction conditions, the vinyl ether formed and the excess of vinyl halide being removed from the reaction mixture if desired and recovered in a condenser. The process may also be carried out continuously by continuously leading the reaction components into a suitable reaction vessel, for example a tower and continuously removing the reaction products, i. e. the vinyl ether and metal halide, from the reaction chamber. Instead of the alcoholates, mixtures of the alcohol, or alcohols, desired with alkaline oxidic compounds, i. e. hydroxides or oxides of alkali metals or alkaline earth metals, for example potassium or sodium hydroxides, calcium oxide, magnesium oxide and the like, may be employed in which mixtures the alcoholates are formed, so that these mixtures are equivalent to the alcoholates in the present process. Similarly the vinyl halides may be replaced by equivalent agents furnishing these halides under the conditions of working, namely by alkylene or alkylidene halides and alkali, and this modification allows of dispensing with tediously first preparing and isolating the vinyl halide. Thus vinyl ethers are obtained in one operation by causing alkylene or alkylidene halides, such as ethylene chloride or ethylidene chloride, to act on the alcoholates, or mixtures of alkaline oxidic agents with the alcohols desired, in the presence of a diluent. According to this process the manufacture and production of vinyl ethers is considerably simplified and cheapened. When working at atmospheric pressure it is preferable, when introducing the alkylene or alkylidene halides into the reaction vessel in which are the reaction components under the necessary reaction conditions, to lead the intermediately formed vinyl halides in circulation through the reaction mixture, the resulting vinyl ether together with the excess of vinyl halide being removed from the reaction mixture, if desired, and separated in a condenser.

Particularly suitable as diluents are those which are capable of dissolving the reaction components under the reaction conditions, for example aliphatic, cycloaliphatic, aliphatic-aromatic and aromatic monohydric or polyhydric alcohols. It is preferable to employ as the diluent an alcohol corresponding to that of the alcoholic component of the alcoholate employed. When different alcohols are present in a free or combined state several alcohols may enter into reaction and a mixture of different vinyl ethers is obtained which may be separated into its components, for example by fractional distillation. As suitable diluents acting as suspending agents may be mentioned for example liquid aliphatic, aromatic or hydroaromatic hydrocarbons or mixtures thereof. The presence of water during the conversion does not, generally speaking, hinder the reaction proceeding, but, for obtaining better yields, it is recommended that water be excluded from the reaction or that the water which in some cases is formed during the reaction be removed by means of non-acid agents which bind water, for example quicklime, anhydrous sodium sulphate, copper sulphate or potash.

The vinyl ethers may be employed as solvents and also for the manufacture of artificial materials, for example artificial resins and the like.

The following examples will further illustrate the nature of this invention but the invention is not restricted to these examples. The parts are by weight.

Example 1

62.5 parts of vinyl chloride are added to a solution of 68 parts of sodium ethyl alcoholate in 138 parts of ethyl alcohol in a stirring autoclave. The contents of the autoclave are then slowly heated up to 100° C. while stirring. The pressure rises to about 20 atmospheres and then gradually declines as the reaction proceeds. After the decline of the pressure has ceased, which is the case after heating for about 12 hours, the contents of the autoclave are cooled, separated from common salt which has separated out and fractionally distilled. The yield of vinyl ethyl ether having a boiling point of 36° C. at about atmospheric pressure, is about 85 per cent of the theoretical yield.

Example 2

111 parts of metallic sodium are dissolved in 1370 parts of anhydrous butanol and the solution is heated at 100° C. in a stirring autoclave together with 300 parts of vinyl chloride. The initial pressure of 20 atmospheres gradually falls to about 8 atmospheres during the course of about 12 hours. After cooling, the contents of the autoclave are separated from the common salt which has separated out and are subjected to fractional distillation. Vinyl butyl ether having a boiling point of from 92° to 93° C. at about atmospheric pressure is obtained in a yield of about 90 per cent. Acetylene is only formed to quite a subordinate degree.

Example 3

392 parts of 100 per cent caustic potash or the corresponding amount of the less pure commercial variety are dissolved in 2590 parts of butanol and then 437.5 parts of vinyl chloride and 400 parts of pulverized quicklime are added. The mixture is heated to 100° C. while stirring, and the pressure at first rises to 14 atmospheres. After stirring for about 16 hours the pressure falls to about 6 atmospheres. After cooling, the lime and common salt formed are filtered off from the reaction mixture. By fractional distillation of the filtrate vinyl butyl ether having a boiling point of from 92° to 93° C. at about atmospheric pressure is obtained in a yield which is 80 per cent of the theoretical yield.

Example 4

Gaseous vinyl chloride is passed by means of a circulating pump through a solution of 96 parts of sodium butylate in 296 parts of butanol contained in a stirring vessel provided with a reflux condenser until adsorption no longer takes place. Immediately after the vinyl chloride is led in, the liquid begins to become turbid in consequence of the separation of common salt. After the reaction is complete, which may be detected by the disappearance of the alkalinity of the solution, the solution is filtered from the common salt which has separated out and the filtrate is fractionally distilled. Vinyl butyl ether is obtained in an almost quantitative yield.

All yields indicated in the foregoing are calculated on the quantity of vinyl chloride employed.

Example 5

390 parts of sodium ortho-cresolate are dissolved in 1600 parts of ethyl alcohol whereupon 187 parts of vinyl chloride are added and the mixture is heated in a stirring autoclave to 180° C. until a sample shows a very slight or no alkaline reaction which state is attained after a few hours heating. The pressure during the reaction is about 26 atmospheres. After the reaction has finished the reaction mass is left cooling, freed from common salt separating out, and by fractional distillation ethyl alcohol and a small quantity of vinyl ethyl ether are distilled off, whereupon the residue is rendered alkaline with caustic soda, if required, and extracted with ethyl ether. After drying the etherial solution, the ether is distilled off and vinyl ortho-cresyl ether with a boiling point of 168° to 170° C. is obtained in a good yield.

When the sodium ortho-cresolate is substituted by sodium meta-cresolate, vinyl meta-cresyl ether with a boiling point of 175° to 177° C. is obtained. Potassium phenolate furnishes vinyl phenyl ether with a boiling point of 157° to 158° C. when applied in the place of the sodium cresolates under the same conditions of working.

Example 6

546 parts of potassium β-naphtholate are dissolved in 1600 parts of ethyl alcohol whereupon 187 parts of vinyl chloride are added and the whole is heated in a stirring autoclave at 180° C. until a sample does not show an alkaline reaction. The reaction mixture is worked up as described in the foregoing example or by distilling off the ethyl alcohol and small quantities of vinyl ethyl ether, by a subsequent distillation with the aid of steam, extraction of the distillate obtained with ethyl ether, drying the etherial solution and final removal of the ether by distillation. A good yield of vinyl β-naphthyl ether with a boiling point of about 264° C. and a melting point of about 33° C. is obtained.

When the sodium β-naphtholate is substituted by an equimolecular proportion of potassium α-naphtholate the vinyl α-naphthyl ether with a boiling point of 258° to 259° C. is obtained.

Example 7

72.5 parts of metallic sodium are dissolved in 550 parts of anhydrous ethyl alcohol, whereupon 230 parts of 2-chloropropylene with a boiling point of 32° to 33° C. are added at about 100° C. and the reaction mixture is heated while stirring in an autoclave at 180° C. and at about 20 atmospheres for about 12 hours until a sample shows a very slight alkalinity. After cooling, the reaction product is subjected to fractional distillation, whereby ethyliso-propenyl ether with a boiling point of 62° to 63° C. is obtained in from 60 to 70 per cent of the theoretical yield together with small quantities of methyl acetylene.

By substituting 2-chloropropylene by an equimolecular quantity of 2-chloro-β-butylene with a boiling point of 64° C. dimethylvinyl ethyl ether having a boiling point of 70° to 72° C. and corresponding to the formula

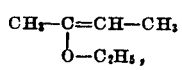

is obtained in a quantity of about 25 per cent of the theoretical yield.

Example 8

46 parts of metallic sodium are dissolved in 368 parts of anhydrous ethyl alcohol in a stirring autoclave. The solution is heated, if not already hot, to about 70° C. and 99 parts of ethylene chloride are introduced gradually in the course of about 2 hours. The whole is then heated to about 100° C. until a sample taken out shows no alkaline reaction, heating for several hours being necessary for this purpose. The pressure drops gradually from about 16 atmospheres to about 8 atmospheres during the reaction. After cooling, the whole is filtered from common salt and the filtrate is fractionally distilled. The yield of vinyl ethyl ether, boiling at 36° C., amounts to about 90 per cent of the theoretical yield and the product may be freed from any small remainder of ethyl alcohol by washing with water, drying with calcium chloride and distilling in the presence of metallic sodium.

By employing an equimolecular proportion of butanol instead of the ethyl alcohol, vinyl butyl ether having a boiling point of about 93° C. is obtained under the same conditions in a practically quantitative yield.

Example 9

448 parts of solid 100 per cent caustic potash are dissolved in 215 parts of water and 920 parts of 94 per cent ethyl alcohol are added thereto. This solution is heated to about 70° C. in a stirring autoclave and 396 parts of ethylene chloride are gradually introduced. The whole is then heated to 100° C. until a sample taken out no longer has an alkaline reaction. The further working up is carried out as described in Example 1. The yield of vinyl ethyl ether amounts to about 50 per cent of the theoretical yield.

Example 10

297 parts of ethylene chloride are gradually introduced at about 100° into a solution of 876 parts of potassium metacresolate in 3200 parts of ethyl alcohol in a stirring autoclave. The mixture is heated for several hours at 180° C. until the alkalinity has disappeared. After cooling, the potassium chloride formed is filtered off and the filtrate is fractionally distilled. After distilling off the ethyl alcohol and small amounts of vinyl ethyl ether, vinyl-meta-cresyl ether passes over in a satisfactory yield between 175° and 177° C., and the meta-cresol set free during the reaction passes over at about 200° C. The vinyl meta-cresyl ether is freed from any meta-cresol present by shaking with dilute caustic soda solution, drying and fractionally distilling.

Example 11

215 parts of metallic sodium are dissolved in 1840 parts of anhydrous ethyl alcohol in a stirring autoclave, whereupon the vessel is heated to about 100° C. and 509 parts of propylene chloride are gradually added for example within a period of 2 hours, the reaction mixture being then heated to 180° C. and stirred until the alkalinity of the reaction mixture has disappeared practically completely or until it has stopped decreasing. After cooling, common salt formed is filtered off and the filtrate is subjected to fractional distillation. Ethyl isopropenyl ether with a boiling point of from 62° to 63° C. is obtained in a yield of from 60 to 70 per cent of the theoretical yield, methyl acetylene being produced in a very small quantity only.

Example 12

572 parts of 2-3-butylene chloride are added at 180° C. to the solution of metallic sodium in anhydrous ethyl alcohol described in the foregoing example, and in the same manner as described with reference to propylene chloride. The reaction mixture is worked up as described in the foregoing example and dimethylvinyl ethyl ether

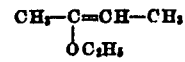

with a boiling point of from 70° to 72° C. is obtained in a yield of 25 per cent of the theoretical yield.

Example 13

248 parts of ethylidene chloride are slowly added to a solution of 115 parts of metallic sodium in 920 parts of anhydrous ethyl alcohol contained in a stirring autoclave at about 120° C., the reaction mixture being then stirred at about the said temperature until a sample does not show an alkaline reaction. The reaction mixture is then worked up as described in Example 1. Vinyl ethyl ether is obtained in a yield of about 90 per cent of the theoretical yield.

Example 14

In the process according to Example 3 butanol is replaced by an equivalent quantity of methanol and proceeded with as described. Methyl vinyl ether having a boiling point of 7° C. is obtained in a good yield of at least 60 per cent of the theoretical yield.

What I claim is:—

1. The process for the production of vinyl ethers which comprises treating a vinyl halide, containing at least one hydrogen atom connected with the carbon atom of the double linkage which is free from halogen, with an alcoholate in the presence of an organic diluent.

2. The process for the production of vinyl ethers which comprises treating a vinyl halide, containing at least one hydrogen atom connected with the carbon atom of the double linkage which is free from halogen, with an alkali metal alcoholate in the presence of an organic diluent.

3. The process for the production of vinyl ethers which comprises treating a vinyl halide, containing at least one hydrogen atom connected with the carbon atom of the double linkage which is free from halogen, with a mixture of an alkali metal with an alcohol in the presence of an organic diluent.

4. The process for the production of vinyl ethers which comprises treating a vinyl halide, containing at least one hydrogen atom connected with the carbon atom of the double linkage which is free from halogen, with an alkali metal alcoholate in the presence of an organic diluent and of an agent binding water.

5. The process for the production of vinyl ethers which comprises treating a vinyl halide, containing at least one hydrogen atom connected with the carbon atom of the double linkage which is free from halogen, with an alcoholate at a temperature between 50° and 200° C. in the presence of an organic diluent.

6. The process for the production of vinyl ethers which comprises treating a vinyl halide, containing at least one hydrogen atom connected with the carbon atom of the double linkage which is free from halogen, with an alcoholate at a temperature between 50° and 200° C. and at a superatmospheric pressure in the presence of an organic diluent.

7. The process for the production of vinyl ethers which comprises treating a vinyl halide, containing at least one hydrogen atom connected with the carbon atom of the double linkage which is free from halogen, with an alcoholate at a temperature between 50° and 200° C. and at a superatmospheric pressure in the presence of an organic diluent and of an agent binding water.

8. The process for the production of vinyl ethers which comprises treating a vinyl halide, containing at least one hydrogen atom connected with the carbon atom of the double linkage which is free from halogen, with an alcoholate in the presence of the alcohol corresponding to the said alcoholate.

9. The process for the production of vinyl ethers which comprises treating a vinyl halide, containing at least one hydrogen atom connected with the carbon atom of the double linkage which is free from halogen, with an alkali metal alcoholate in the presence of the alcohol corresponding to the said alcoholate.

10. In the process for the production of vinyl ethers according to claim 1 the step which consists in replacing the vinyl halide by a di-halogen derivative of ethane.

11. In the process for the production of vinyl ethers according to claim 1, the step which consists in replacing the vinyl halide by a di-halogen derivative of ethane and in replacing the alcoholate by an equivalent mixture of an alcohol with an alkaline oxidic agent.

12. The process for the production of vinyl ethers which comprises treating vinyl chloride with an alkali metal alcoholate in the presence of the alcohol corresponding to the said alcoholate.

WALTER REPPE.